F. E. WILCOX.
FIFTH WHEEL FOR VEHICLES.
APPLICATION FILED AUG. 26, 1911.

1,022,013.

Patented Apr. 2, 1912.

WITNESSES
C. N. Davies.
Ralph Wormelle

INVENTOR.
F. E. Wilcox.
By H. G. Stebbins, Attorney.

COLUMBIA PLANOGRAPH CO., WASHINGTON, D. C.

UNITED STATES PATENT OFFICE.

FRANK E. WILCOX, OF MECHANICSBURG, PENNSYLVANIA.

FIFTH-WHEEL FOR VEHICLES.

1,022,013.  Specification of Letters Patent.  Patented Apr. 2, 1912.

Application filed August 26, 1911. Serial No. 646,149.

*To all whom it may concern:*

Be it known that I, FRANK E. WILCOX, a citizen of the United States, residing at Mechanicsburg, in the county of Cumberland and State of Pennsylvania, have invented certain new and useful Improvements in Fifth-Wheels for Vehicles, of which the following is a specification.

My invention relates to fifth wheels, and in particular to the lower member thereof, the object being the production of such a member in a new and cheaper way than heretofore known and without impairing its strength or lessening its efficiency in service.

The invention consists in certain novelties of construction and combinations of parts as hereinafter set forth and claimed.

The accompanying drawing illustrates an example of the physical embodiment of the invention constructed according to the best mode of procedure I have so far devised for the purpose.

Figure 1:
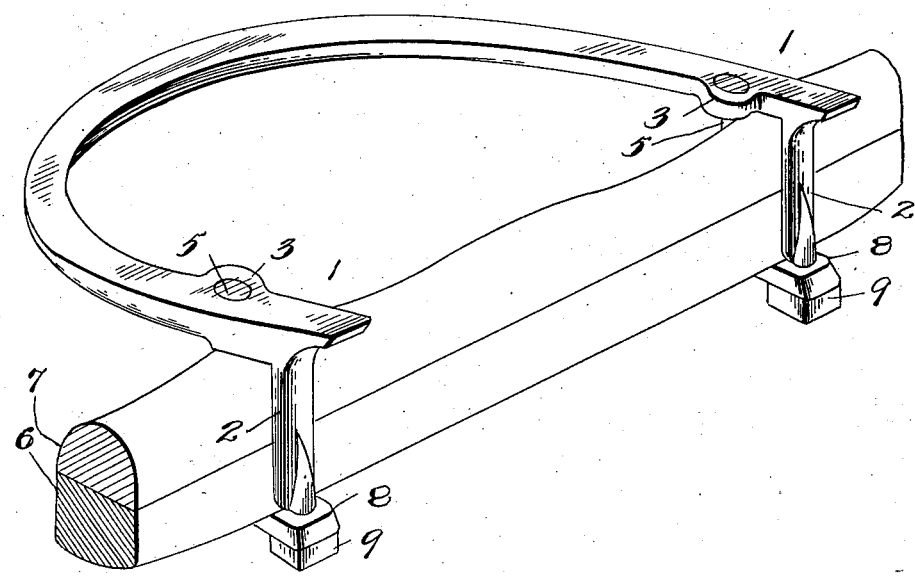
Figure 2:
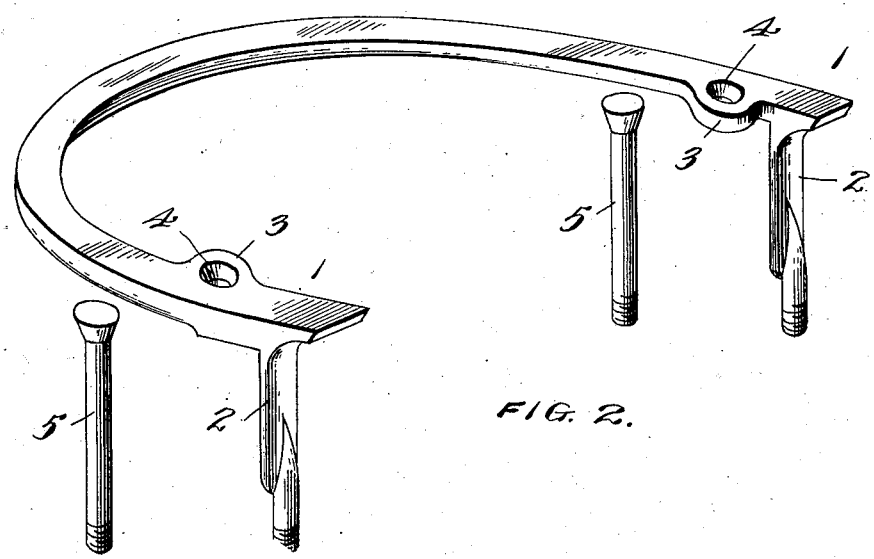

Figure 1 is a view in perspective of a lower fifth wheel member secured to an axle and axle bed and embodying my invention. Fig. 2 is a perspective view of the said lower member detached, along with the two tire bolts which are used therewith.

Heretofore it has been customary in forging the lower members of fifth wheels to fashion the metal at each end into two integral prongs threaded at their ends, said prongs being located at opposite sides of the axle when the member is applied. This method of forging has involved considerable labor and increased the first cost. I have conceived of forging the member with one prong only at each end, which can be accomplished easily and cheaply, offsetting the metal at the rear of each prong and making therethrough tapered holes to receive tire bolts which will perform the functions of the rear prongs previously present in such member.

Referring to the figures of the drawing, I forge the ends 1, 1 of the member into prongs 2, 2 and thread the ends. Back of the prongs the metal is spread at 3, 3 and holes 4, 4 formed therein, through which are passed the threaded tire bolts 5, 5, the heads fitting the holes and being flush with the top wearing surface of the member. Being offset so there is considerable and sufficient metal at the sides, the heads of the bolts will not be subjected to but little wear in service.

In applying the member to an axle 6 and bed 7 the perforated ties 8, 8 are passed over the threaded ends of the prongs and two bolts and nuts 9, 9 applied to the ends.

In this way I provide a lower member of a fifth wheel at a much reduced cost and one which is as strong and durable as the construction heretofore generally made and used.

What I claim is:

1. A substantially semicircular metallic lower member of a fifth wheel, having at each end a single integral threaded prong disposed at right angles to the plane of the body of said member, and the metal of the circular portion of the member adjacent the top ends of the prongs offset and a hole in each offset portion of the metal.

2. The combination with a vehicle axle, of a lower member of a fifth wheel with a single integral threaded prong at each end, the metal at the rear of each prong offset and provided with a tapered hole, tire bolts with tapered heads seated in the holes, and perforated ties and nuts applied to the threaded ends of the prongs and bolts.

In testimony whereof I affix my signature in presence of two witnesses.

FRANK E. WILCOX.

Witnesses:
B. M. VOGELSONG,
J. E. HOERNER.

Copies of this patent may be obtained for five cents each, by addressing the "Commissioner of Patents, Washington, D. C."